No Printed Specification Available
B. BLANEY.
2 Sheets—Sheet 1.
8,527 X
Bake Oven.
Patented Dec. 17, 1834.
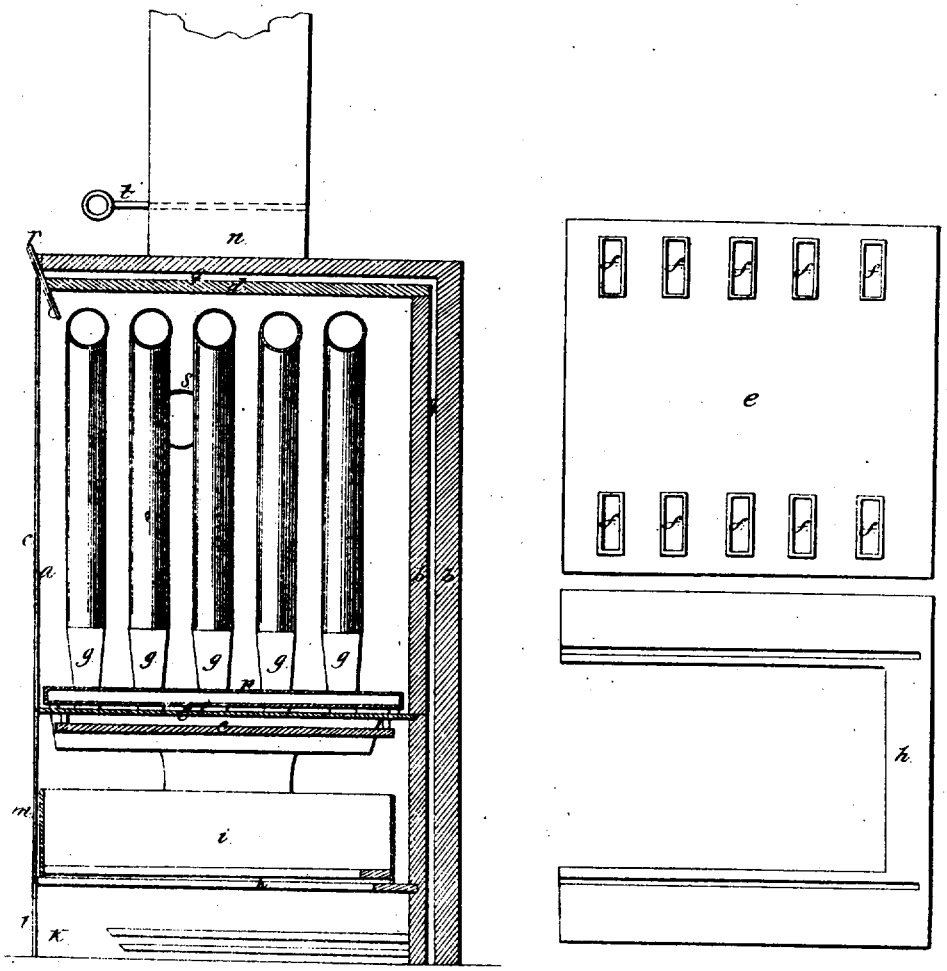

8,527X
B. BLANEY.
Bake Oven.
2 Sheets—Sheet 2.
Patented Dec. 17, 1834.
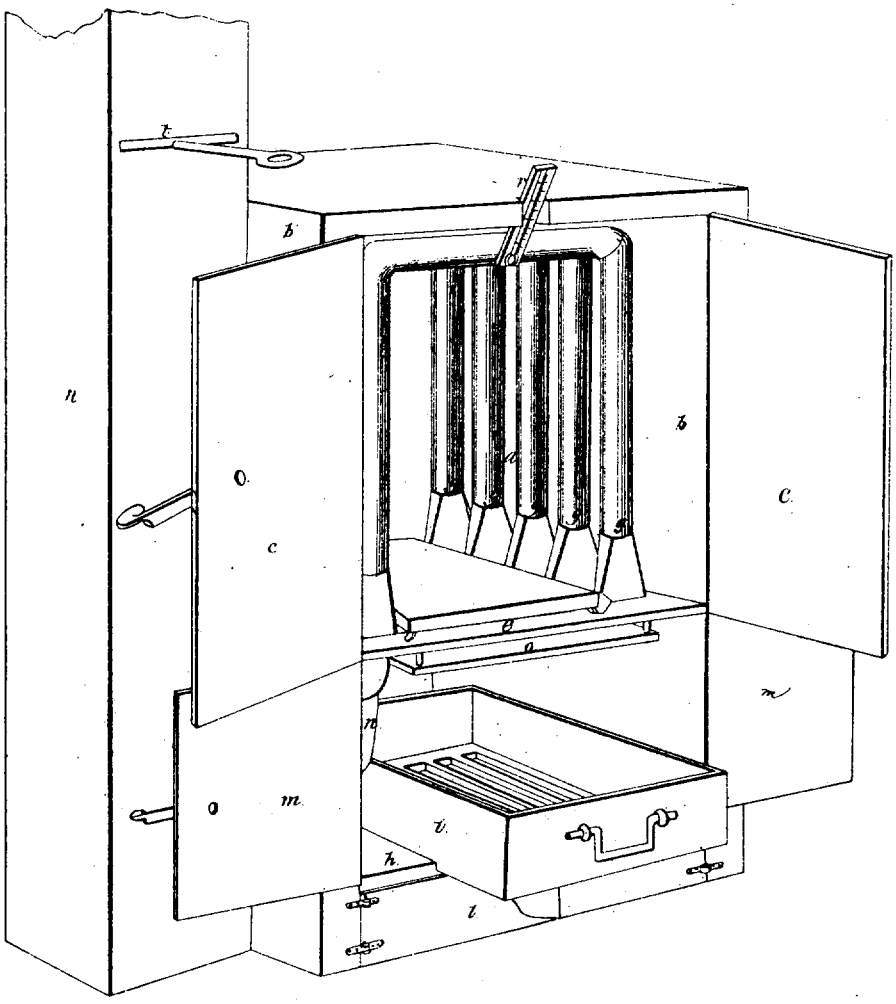

Arr 10
Dec. 17. 1834 4

Benjamin Blaney, a Citizen of the U. S.

Letters Patent.

The Schedule referred to in these Letters Patent and making parts of the same, containing a description in the Words of the said Benjamin Blaney himself of his Improvement in the mode of making & erecting ovens, for domestic and other purposes, called "Blaneys Oven."

"Blaneys Oven" may be placed wherever other ovens may be conveniently, and is constructed of Brick and iron, as follows, & is exhibited in the drawings herewith, -

First. The space for the oven is of a square form, and is inclosed on three sides with Brick walls, and a double Iron door on the fourth or front, and is covered over the top with soapstone, brick or iron. The bottom to be of cast Iron, with a row of oblong perforations on each side near the edge about two inches wide, by six inches long, or with a rim on each, projecting upward, upon which sheet or cast iron funnels are to be placed for the passage of the smoke and heat from the furnace as herein after described.

Second. on the bottom of the furnace room, under the oven, is a cast Iron plate, with grooves in which the furnace is to slide, having a perforation nearly of the size and directly beneath the bottom of the furnace to admit the air which passes through the Ash-pit into the furnace for the support of combustion. The ash-pit is furnished with a door nicely fitted, which when closed will stop the circulation of the air through the furnace and flues of the oven.

Third. An oblong square box of cast Iron, with grated bottom bottom, is made to slide in and out, for the conveni-
ence of charging, & discharging, and with or without,
being wholly removed from the furnace room.

Fourth. The door of the furnace room is to be opened
and the furnace to be drawn out of the furnace room
sufficient to be conveniently charged, which done,
and the kindling ignited, it is to be shoved back into
its place over the perforation in the bottom plate of the
furnace room. The air door of the ash-pit is to be opened
to allow the air to pass freely through the ash-pit into &
through the furnace- the heat and smoke from which will
act upon the bottom of the oven, passing across underneath
the same, to and through the row of perforations on one
side of the oven bottom, into funnels which are placed
over each of the perforations, and within the space
inclosed for the oven by the brick walls, rising per=
pendicularly nearly to the top of the oven, thence pass=
ing across the top in the funnels; & within the enclosure,
thence descending in the funnels, through the perfora=
tions on the other side of the oven bottom, into the main
flue or chimney.- thus by allowing the heat and smoke
to rise in the funnels, to & across the oven, radiating in
its passage, from all sides of the funnels, and then,
causing it to descend below the bottom of the oven before
it enters the main flue or chimney, the greatest possible
economy of heat is obtained within the space inclosed
by the brick walls.

Fifth. There is to be in the furnace room a thick and
iron plate, something larger than the top of, and sus-
pended immediately over the furnace at a little distance
from the underside of the oven bottom, to prevent the fire
from acting too powerfully on the cast iron bottom of the
oven, and thereby injuring the same.

Sixth.

Sixth. There is also to be an air tight sheet iron case,
from one to two inches thick with legs upon the corners
about one inch high placed within the oven upon the
cast iron bottom to equalise the heat, & prevent it from
acting too intensely upon the bottom or lower part of
whatever may be baking.

Seventh. above the covering of the oven is an air
tight cavity from one to two inches high, to prevent the
heat from being conducted off into, and through the
masonry, and which cavity if there is sufficient room to
admit of it, may be extended all round upon the outside
of the brick walls of the oven, thereby rendering it more per
fect.

Eighth. There is to be a Thermometer conspicu-
ously placed above the oven door, the globe of which
is immersed in the atmosphere of the oven to indicate
the temperature, thereby enabling the Operator to pro-
duce the desired results with certainty.

Ninth. There is to be a ventilator, with a valve
placed in the side wall through which the steam
and vapour may escape into the main flue. There is also
to be a damper placed across the main flue, higher than
the top of the oven, which being closed, retains all the heat
that may have accumulated in the mason work, thus
rendering it equal to a common oven, after the fire
is extinguished. There is also to be a stopper placed in
the partition dividing the furnace room from the main
flue or chimney, for the purpose of clearing conveniently
the furnace and flues.

The advantages of this new improvement over
all other ovens, now in use consists in producing
the desired results with greater certainty and expedi-
tion than in any other known mode and at much
less less expense, as the fire is applied directly to their
object and with the least possible waste of heat,
and may be used with any sort of fuel.

The petitioner claims as new and useful in his
Improvements, the general arrangement of the oven,
and particularly the passing of the heat in the funnels
within the brick walls as above described and
also the application of the thermometer, which enables
the operators to graduate the heat and accomplish
with certainty the desired results.

In Testimony that the above is a true speci-
fication of my said improvement, as above de=
scribed, I have hereto set my hand this fifth day
of November, in the year of our Lord, one thousand
eight hundred and thirty four.

Witnesses
George Gay.
D. A. Simmons.

Benj. Blaney.

[illegible]
[illegible]

[illegible]

Drawing